US009627993B2

(12) United States Patent
Cao (10) Patent No.: US 9,627,993 B2
(45) Date of Patent: Apr. 18, 2017

(54) AC-DC CONVERSION CIRCUIT

(71) Applicant: Shenzhen China Star Optoelectronics Technology Co., Ltd., Guangdong (CN)

(72) Inventor: Dan Cao, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 183 days.

(21) Appl. No.: 14/404,463

(22) PCT Filed: Aug. 11, 2014

(86) PCT No.: PCT/CN2014/084062
§ 371 (c)(1),
(2) Date: Nov. 27, 2014

(87) PCT Pub. No.: WO2016/015356
PCT Pub. Date: Feb. 4, 2016

(65) Prior Publication Data
US 2016/0204712 A1 Jul. 14, 2016

(30) Foreign Application Priority Data

Jul. 29, 2014 (CN) .......................... 2014 1 0367699

(51) Int. Cl.
*H02M 3/335* (2006.01)
*H02M 7/217* (2006.01)
*H02M 1/32* (2007.01)

(52) U.S. Cl.
CPC ............. *H02M 7/217* (2013.01); *H02M 1/32* (2013.01)

(58) Field of Classification Search
CPC .... H02M 1/081; H02M 1/4258; H02M 3/157; H02M 3/33515; H02M 3/33523; H02M 3/33507; H02M 3/33546
(Continued)

(56) References Cited

U.S. PATENT DOCUMENTS

| 2009/0153123 A1* | 6/2009 | Kraft ...................... H02M 1/32 323/285 |
| 2010/0027299 A1* | 2/2010 | Fang ................. H02M 3/33507 363/21.15 |

(Continued)

FOREIGN PATENT DOCUMENTS

| CN | 101212185 | 7/2008 |
| CN | 101841149 | 9/2010 |

(Continued)

OTHER PUBLICATIONS

International Search Report and the Written Opinion Dated Nov. 28, 2014 From the State Intellectual Property Office of the People's Republic of China Re. Application No. PCT/CN2014/084062 and Its Translation of Search Report in English.

*Primary Examiner* — Adolf Berhane
*Assistant Examiner* — Gary Nash (57) ABSTRACT

An AC-DC conversion circuit is disclosed. The AC-DC conversion circuit has an inputting module, a rectifying module, a transforming module, an outputting module, a voltage detecting module, and a controlling module. The voltage detecting module is used to detect the DC voltage outputted from the rectifying module, the controlling module is used to control whether the AC-DC conversion circuit works or not according to a detecting result of the voltage detecting module. This prevents damage of the AC-DC conversion circuit and unstable output voltage by disposing the voltage detecting module and the controlling module.

16 Claims, 3 Drawing Sheets

(58) Field of Classification Search
USPC .......................................... 363/21.04–21.18
See application file for complete search history.

(56) References Cited

U.S. PATENT DOCUMENTS

| | | | | |
|---|---|---|---|---|
| 2010/0123447 | A1* | 5/2010 | Vecera | H02M 1/32 |
| | | | | 323/290 |
| 2010/0219802 | A1* | 9/2010 | Lin | H02M 3/33507 |
| | | | | 323/284 |
| 2010/0284207 | A1* | 11/2010 | Watanabe | H02M 3/157 |
| | | | | 363/126 |

FOREIGN PATENT DOCUMENTS

| | | |
|---|---|---|
| CN | 202586774 | 12/2012 |
| CN | 102857105 | 1/2013 |

* cited by examiner

AC-DC CONVERSION CIRCUIT

RELATED APPLICATIONS

This application is a National Phase of PCT Patent Application No. PCT/CN2014/084062 having International filing date of Aug. 11, 2014, which claims the benefit of priority of Chinese Patent Application No. 201410367699.5 filed on Jul. 29, 2014. The contents of the above applications are all incorporated by reference as if fully set forth herein in their entirety.

BACKGROUND OF THE INVENTION

Field of Invention

The present invention relates to a field of circuit design, and in particular, to an AC (alternating current)-DC (direct current) conversion circuit.

Description of Prior Art

Along with social development, people use a variety of electronic equipments to satisfy personal needs. Because some electronic equipment of the electronic equipments work with DC current is more stable, a design of AC-DC conversion circuit inside the electronic equipment becomes a key factor for making the electronic equipment work in a stable condition.

Figure 1:
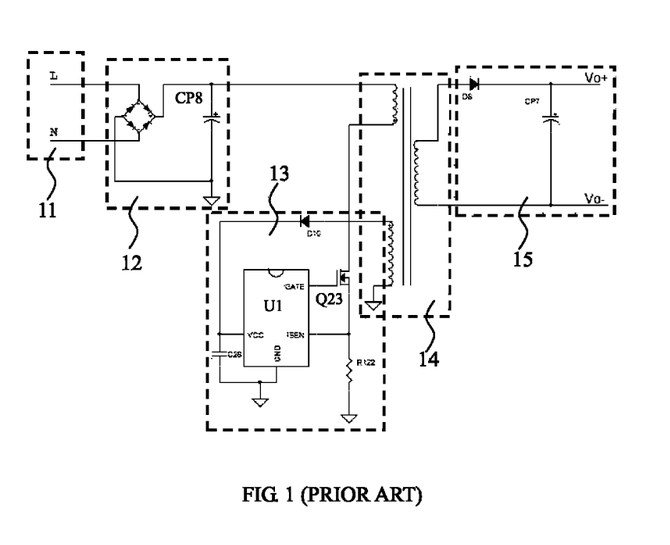
FIG. 1 is a diagram of a conventional AC-DC conversion circuit.

FIG. 1 is a diagram of a conventional AC-DC conversion circuit, where 11 indicates an inputting module, 12 indicates a rectifying module, 13 indicates a controlling module, 14 indicates a transforming module, and 15 indicates an outputting module. The rectifying module 12 could properly transform an AC current from the inputting module 11 to be a DC voltage, then the AC-DC conversion circuit could properly control the DC voltage outputting from the rectifying module 12 with a controlling chip U1 of the controlling module 13 to let the transforming module 14 perform the transforming process. Finally, the outputting module 15 outputs a corresponding DC voltage.

However, a filtering capacitor CP8 or a transistor Q23 may be burn out when an input voltage of the inputting module 11 is too high. An output voltage of the outputting module 15 might be unstable when the input voltage of the inputting module 11 is too low.

Therefore, the conventional AC-DC conversion circuit is need to solve the existing problem.

SUMMARY OF THE INVENTION

The purpose of the present invention is to provide an AC-DC conversion circuit to solve technical problems of the prior art when the input voltage is too high or too low, and the technical problem causes the output voltage to be unstable or the conversion circuit to be easily damaged.

To achieve the above purposes, the present invention provides a technical proposal as below.

The present invention provides an AC-DC conversion circuit, comprising:

An inputting module is used to input an AC voltage. A rectifying module is used to transform the AC voltage to a DC voltage. A transforming module is used to perform a transforming process. An outputting module is used to output the DC voltage after the transforming process. A voltage detecting module is used to detect the DC voltage outputted from the rectifying module. A controlling module is used to control whether the AC-DC conversion circuit works or not according to a detecting result of the voltage detecting module.

The rectifying module comprises: a rectifying bridge used to transform the AC voltage received by the inputting module to the DC voltage, and a first filtering capacitor used to filter the DC voltage.

A terminal of the first filtering capacitor is connected with an output of the rectifying bridge, another terminal of the first filtering capacitor is connected with a ground.

The outputting module comprises a second diode and a second filtering capacitor.

A positive electrode of the second diode is connected with an output of the transforming module, a negative electrode of the second diode is connected with an output of the AC-DC conversion circuit. A terminal of the second filtering capacitor is connected with the negative electrode of the second diode, another terminal of the second filtering capacitor is connected with the ground.

In the AC-DC conversion circuit of the present invention, the voltage detecting module comprises a first comparator and a second comparator.

A first input terminal of the first comparator is connected with the output of the rectifying bridge, a second input terminal of the first comparator is received a first reference voltage, and an output terminal of the first comparator outputs a first comparison signal.

A second input terminal of the second comparator is connected with the output of the rectifying bridge, a first input terminal of the second comparator is received a second reference voltage, and an output terminal of the second comparator outputs a second comparison signal.

In the AC-DC conversion circuit of the present invention, the controlling module comprises a first controlling device.

The first controlling device comprises a first transistor and a second transistor. A controlling terminal of the first transistor is received the first comparison signal. An output terminal of the first transistor is connected with the ground. An input terminal of the first transistor is connected with a controlling terminal of the second transistor and a power supply. An input terminal of the second transistor is connected with the first filtering capacitor, and an output terminal of the second transistor is connected with the ground.

In the AC-DC conversion circuit of the present invention, upon the condition that the output voltage of the rectifying bridge is greater than or equal to the first reference voltage, the first comparison signal is at a high level, the first transistor turns on, and the second transistor turns off.

Upon the condition that the output voltage of the rectifying bridge is less than the first reference voltage, the first comparison signal is at a low level, the first transistor turns off, and the second transistor turns on.

In the AC-DC conversion circuit of the present invention, the controlling module comprises a second controlling device.

The second controlling device comprises a controlling chip and a third transistor, the controlling chip comprises a power pin, an over-current protection pin, and a gate controlling pin.

A controlling terminal of the third transistor is connected with the gate controlling pin of the controlling chip, an inputting terminal of the third transistor is connected with the outputting terminal of the rectifying module, and an outputting terminal of the third transistor is individually connected with the over current protection pin and the ground.

The power pin of the controlling chip is connected with the output terminal of the rectifying module by the transforming module.

In the AC-DC conversion circuit of the present invention, the power pin of the controlling chip is connected with the transforming module by a first diode, a positive electrode of the first diode is connected with the transforming module, and a negative electrode of the first diode is connected with the power pin of the controlling chip.

In the AC-DC conversion circuit of the present invention, the second controlling device further comprises a fourth transistor and a fifth transistor.

A controlling terminal of the fourth transistor is received the first comparison signal, an input terminal of the fourth transistor is connected with the power pin of the controlling chip, and an output terminal of the fourth transistor is connected with the ground.

A controlling terminal of the fifth transistor is inputted the second comparison signal. An input terminal of the fifth transistor is connected with the power pin of the controlling chip, and an output terminal of the fifth transistor is connected with the ground.

In the AC-DC conversion circuit of the present invention, upon the condition that the output voltage of the rectifying bridge is greater than or equal to the first reference voltage, the first comparison signal is at a high level, the fourth transistor turns on, and the controlling chip stops working.

Upon the condition that the output voltage of the rectifying bridge is less than or equal to the second reference voltage, the second comparison signal is at a high level, the fifth transistor turns on, and the controlling chip stops working.

Upon the condition that the output voltage of the rectifying bridge is greater than the second reference voltage, and the output voltage of the rectifying bridge is less than the first reference voltage, the first comparison signal and the second comparison signal are both at a low level, the fourth transistor and the fifth transistor both turn off, and the controlling chip works normally.

The present invention provides an AC-DC conversion circuit, comprising:

An inputting module used to input an AC voltage, a rectifying module used to transform the AC voltage to a DC voltage, a transforming module used to make a transforming process, an outputting module used to output the DC voltage after the transforming process, a voltage detecting module used to detect the DC voltage outputted from the rectifying module, and a controlling module used to control whether the AC-DC conversion circuit works or not according to a detecting result of the voltage detecting module.

In the AC-DC conversion circuit of the present invention, the rectifying module comprises: a rectifying bridge used to transform the AC voltage received by the inputting module to the DC voltage, and a first filtering capacitor is used to filter the DC voltage.

A terminal of the first filtering capacitor is connected with an output of the rectifying bridge, and another terminal of the first filtering capacitor is connected with a ground.

In the AC-DC conversion circuit of the present invention, the voltage detecting module comprises a first comparator and a second comparator.

A first input terminal of the first comparator is connected with the output of the rectifying bridge, a second input terminal of the first comparator is received a first reference voltage, and an output terminal of the first comparator outputs a first comparison signal.

A second input terminal of the second comparator is connected with the output of the rectifying bridge, a first input terminal of the second comparator is inputted a second reference voltage, and an output terminal of the second comparator outputs a second comparison signal.

In the AC-DC conversion circuit of the present invention, the controlling module comprises a first controlling device.

The first controlling device comprises a first transistor and a second transistor. a controlling terminal of the first transistor is inputted the first comparison signal, an output terminal of the first transistor is connected with the ground, an input terminal of the first transistor is individually connected with a controlling terminal of the second transistor and a power, an input terminal of the second transistor is connected with the first filtering capacitor, and an output terminal of the second transistor is connected with the ground.

In the AC-DC conversion circuit of the present invention, upon the condition that the output voltage of the rectifying bridge is greater than or equal to the first reference voltage, the first comparison signal is at a high level, the first transistor turns on, and the second transistor turns off.

Upon the condition that the output voltage of the rectifying bridge is less than the first reference voltage, the first comparison signal is at a low level, the first transistor turns off, and the second transistor turns on.

In the AC-DC conversion circuit of the present invention, the controlling module comprises a second controlling device.

The second controlling device comprises a controlling chip and a third transistor. The controlling chip comprises a power pin, an over current protection pin, and a gate controlling pin.

A controlling terminal of the third transistor is connected with the gate controlling pin of the controlling chip, an inputting terminal of the third transistor is connected with the outputting terminal of the rectifying module, and an outputting terminal of the third transistor is connected with the over current protection pin and the ground.

The power pin of the controlling chip is connected with the output terminal of the rectifying module by the transforming module.

In the AC-DC conversion circuit of the present invention, the power pin of the controlling chip is connected with the transforming module by a first diode, a positive electrode of the first diode is connected with the transforming module, and a negative electrode of the first diode is connected with the power pin of the controlling chip.

In the AC-DC conversion circuit of the present invention, the second controlling device further comprises a fourth transistor and a fifth transistor.

A controlling terminal of the fourth transistor is received the first comparison signal, an input terminal of the fourth transistor is connected with the power pin of the controlling chip, and an output terminal of the fourth transistor is connected with the ground.

A controlling terminal of the fifth transistor is received the second comparison signal, an input terminal of the fifth transistor is connected with the power pin of the controlling chip, and an output terminal of the fifth transistor is connected with the ground.

In the AC-DC conversion circuit of the present invention, upon the condition that the output voltage of the rectifying bridge is greater than or equal to the first reference voltage, the first comparison signal is at a high level, the fourth transistor turns on, and the controlling chip stops working.

In the AC-DC conversion circuit of the present invention, upon the condition that the output voltage of the rectifying bridge is less than or equal to the second reference voltage, the second comparison signal is at a high level, the fifth transistor turns on, and the controlling chip stops working.

In the AC-DC conversion circuit of the present invention, upon the condition that the output voltage of the rectifying bridge is greater than the second reference voltage, and the rectifying bridge is less than the first reference voltage, the first comparison signal and the second comparison signal are both at a low level, the fourth transistor and the fifth transistor both turn off, and the controlling chip works normally.

In the AC-DC conversion circuit of the present invention, the outputting module comprises a second diode and a second filtering capacitor.

A positive electrode of the second diode is connected with an output of the transforming module, a negative electrode of the second diode is connected with an output of the AC-DC conversion circuit, a terminal of the second filtering capacitor is connected with the negative electrode of the second diode, and another terminal of the second filtering capacitor is connected with the ground.

Compared to the prior art, the AC-DC conversion circuit of the present invention stops voltage output upon the condition that the input voltage is too high or too low by disposing the voltage detecting module and the controlling module to prevent the damage of the AC-DC conversion circuit and the unstable voltage output, which solves the technical problems of the prior art upon the condition that the input voltage is too high or too low, and the technical problem causes the output voltage to be unstable or the conversion circuit to be easily damaged.

To allow the present invention to be more clearly understood, preferred embodiments are given below, and accompanied with drawings, and are described in detail as follows:

DETAILED DESCRIPTION OF THE PREFERRED EMBODIMENTS

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

In drawings, those units with similar structure are marked with the same label.

Figure 2:
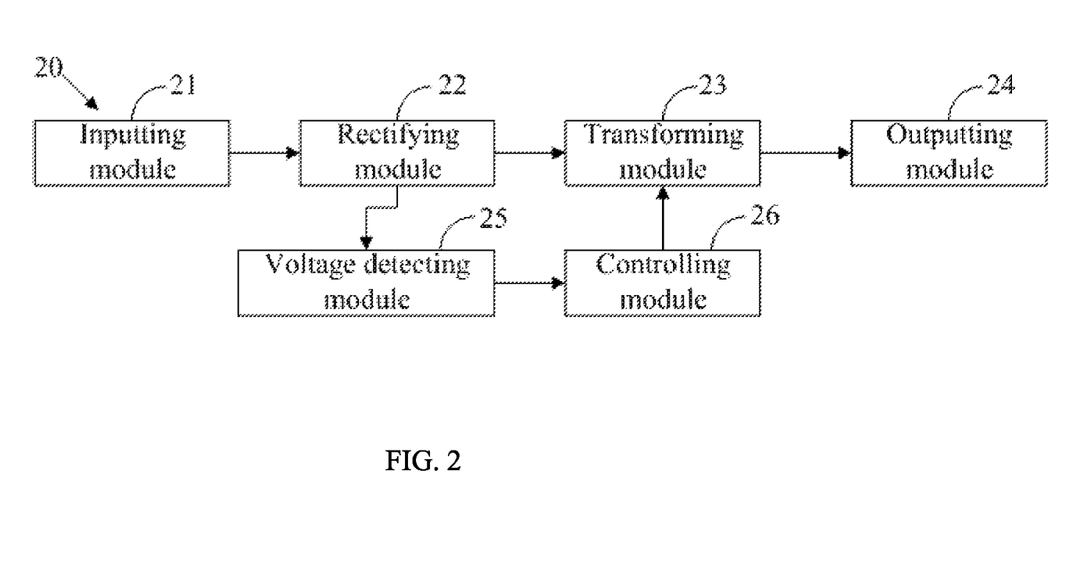
FIG. 2 is a block diagram of an AC-DC conversion circuit according to a preferred embodiment of the present invention.
Figure 3:
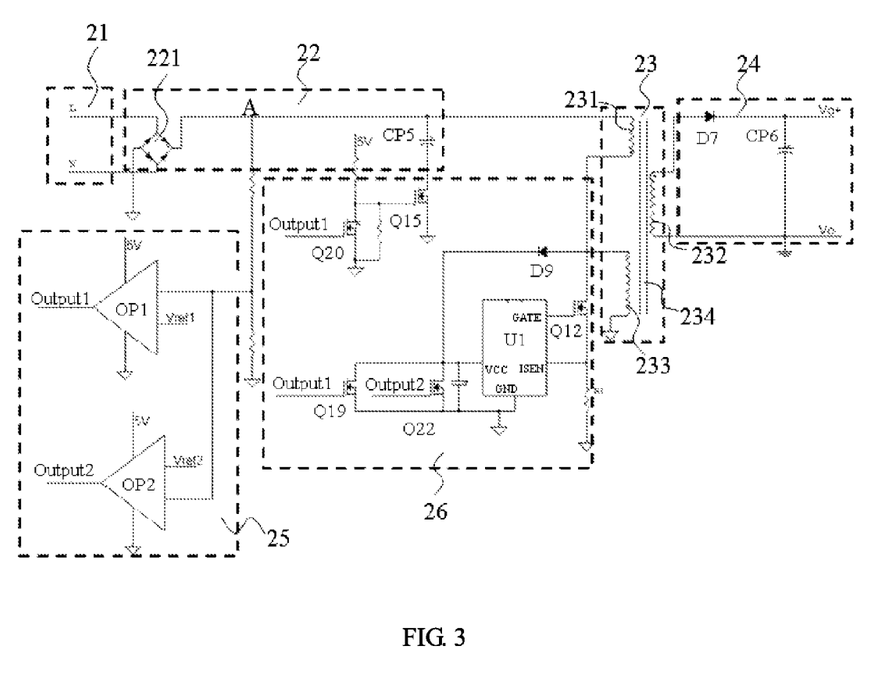
FIG. 3 is a circuit diagram of an AC-DC conversion circuit according to the preferred embodiment of the present invention.

Please refer to FIG. 2 and FIG. 3. FIG. 2 is a block diagram of an AC-DC conversion circuit according to a preferred embodiment of the present invention. FIG. 3 is a circuit diagram of an AC-DC conversion circuit according to the preferred embodiment of the present invention. The AC-DC conversion circuit 20 of the preferred embodiment comprises an inputting module 21, a rectifying module 22, a transforming module 23, an outputting module 24, a voltage detecting module 25, and a controlling module 26.

The inputting module 21 is used to input an AC voltage, the rectifying module 21 is used to transform the AC voltage to a DC voltage, the transforming module 23 is used to make a transforming process, the outputting module 24 is used to output the DC voltage after the transforming process, the voltage detecting module 26 is used to detect the DC voltage outputted from the rectifying module 22, and the controlling module 26 is used to control whether the AC-DC conversion circuit 20 works or not according to a detecting result of the voltage detecting module 25.

The rectifying module 22 comprises a rectifying bridge 221 and a first filtering capacitor CP5. The rectifying bridge 221 is used to transform the AC voltage received by the inputting module 21 to the DC voltage. The first filtering capacitor CP5 is used to filter the DC voltage. A terminal of the first filtering capacitor CP5 is connected with an output of the rectifying bridge 221, and another terminal of the first filtering capacitor CP5 is connected with ground.

The transforming module 23 comprises a primary coil 231, a first sub coil 232, a second sub coil 233, and an iron core 234, the first sub coil 232 outputs the DC voltage after the transforming process, the second sub coil 233 outputs a driving voltage to drive the controlling module 26.

The outputting module 24 comprises a second diode D7 and a second filtering capacitor CP6. A positive electrode of the second diode D7 is connected with an output of the transforming module 23, a negative electrode of the second diode D7 is connected with an output of the AC-DC conversion circuit 20. A terminal of the second filtering capacitor CP6 is connected with the negative electrode of the second diode D7, and another terminal of the second filtering capacitor CP6 is connected with the ground.

The voltage detecting module 25 comprises a first comparator OP1 and a second comparator OP2. A first input terminal of the first comparator OP1 is connected with the output of the rectifying bridge 221, a second input terminal of the first comparator OP1 is received a first reference voltage Vref1, and an output terminal of the first comparator OP1 outputs a first comparison signal Output1. A second input terminal of the second comparator OP2 is connected with the output of the rectifying bridge 221, a first input terminal of the second comparator OP2 is received a second reference voltage Vref2, and an output terminal of the second comparator OP2 outputs a second comparison signal Output2.

The controlling module 26 comprises a first controlling device and a second controlling device. The first controlling device comprises a first transistor Q20 and a second transistor Q15. A controlling terminal of the first transistor Q20 is received the first comparison signal Output1, an output terminal of the first transistor Q20 is connected with the ground, an input terminal of the first transistor Q20 is individually connected with a controlling terminal of the second transistor Q15 and a power, an input terminal of the second transistor Q15 is connected with the first filtering capacitor CP5, and an output terminal of the second transistor Q15 is connected with the ground.

The second controlling device comprises a controlling chip U1, a third transistor Q12, a fourth transistor Q19, and a fifth transistor Q22. The controlling chip U1 comprises a power pin VCC, an over current protection pin ISEN, a gate controlling pin GATE, and a ground pin GND. A controlling terminal of the third transistor Q12 is connected with the gate controlling pin GATE of the controlling chip U1, an inputting terminal of the third transistor Q12 is connected with the outputting terminal of the rectifying module 22, an outputting terminal of the third transistor Q12 is individually connected with the over current protection pin ISEN and the ground. The power pin VCC of the controlling chip U1 is connected with the transforming module 23 by a first diode D9, then is further connected with the output terminal of the rectifying module 22. A positive electrode of the first diode D9 is connected with the transforming module 23, and a negative electrode of the first diode D9 is connected with the power pin VCC of the controlling chip U1.

A controlling terminal of the fourth transistor Q19 is received the first comparison signal Output1, an input terminal of the fourth transistor Q19 is connected with the power pin VCC of the controlling chip U1, and an output terminal of the fourth transistor Q19 is connected with the ground. A controlling terminal of the fifth transistor Q22 is received the second comparison signal Output2, an input terminal of the fifth transistor Q22 is connected with the power pin VCC of the controlling chip U1, and an output terminal of the fifth transistor Q22 is connected with the ground.

Upon the condition that the AC-DC conversion circuit 20 is working, firstly, a highest working voltage (the first comparison signal Output1) and a lowest working voltage (the second comparison signal Output2) are set. Upon the condition that the output voltage of the rectifying bridge 221 is less than the first reference voltage Output1, and the output voltage of the rectifying bridge 221 is greater than the second reference voltage Output2, the AC-DC conversion circuit could output the DC voltage normally. Upon the condition that the output voltage of the rectifying bridge 221 is greater than or equal to the first comparison signal Output1, or the output voltage of the rectifying bridge 221 is less than or equal to the second comparison signal Output2, the AC-DC conversion circuit 20 will stop to output voltage to prevent damage of the AC-DC conversion circuit and to prevent the output voltage being unstable.

Upon the condition that the output voltage of the rectifying bridge 221 is less than the first reference voltage Vref1, and the output voltage of the rectifying bridge 221 is greater than the second reference voltage Vref2, in other words, a voltage of A is less than the first reference voltage Vref1, and the voltage of A is greater than a second reference voltage Vref2, then, a voltage of the second input terminal of the first comparator OP1 (the first reference voltage Vref1) is greater than a voltage of the first input terminal of the first comparator OP1 (the output voltage of the rectifying bridge 221), the output terminal of the first comparator OP1 outputs a low level voltage (the first comparison signal Output1). A voltage of the second input terminal of the second comparator OP2 (the output voltage of the rectifying bridge 221) is also greater than a voltage of the first input terminal of the second comparator OP2, and the output terminal of the second comparator OP2 outputs a low level voltage (the second comparison signal Output2).

The controlling terminal of the first transistor Q20 of the first controlling device of the controlling module 26 receives the first comparison signal Output1 with the low level voltage, so the first transistor Q20 turns off. The controlling terminal of the second transistor Q15 of the first controlling device is connected with the power, the second transistor Q15 turns on, so one terminal of the first filtering capacitor CP5 is connected with the ground through the second transistor Q15, and the first filtering capacitor CP5 works normally.

The controlling terminal of the fourth transistor Q19 of the second controlling device of the controlling module 26 receives the first comparison signal Output1 with the low level voltage, the fourth transistor Q19 turns off. The controlling terminal of the fifth transistor Q22 of the first controlling device receives the second comparison signal Output2 with the low level voltage, and the fifth transistor Q22 also turns off. The power pin VCC of the controlling chip U1 is connected with the transforming module 23 through the first diode D9, and receives the output voltage of the transforming module 23.

At the same time, the gate controlling pin GATE of controlling chip U1 outputs a high level voltage to the controlling terminal of the third transistor Q12, the third transistor Q12 turns on, the output terminal of the rectifying module 22 individually connects with the over current protection pin ISEN and the ground through the third transistor Q12, so the controlling chip U1 can properly detect the output current from the rectifying module 22 by the over current protection pin ISEN, and ensures that the AC-DC conversion circuit is in a normal working condition.

Upon the condition that the output voltage of the rectifying bridge 221 is greater than or equal to the first reference voltage Vref1, in other words, the voltage of A is greater than or equal to the first reference voltage Vref1, then, the voltage of the second input terminal of the first comparator OP1 (the first reference voltage Vref1) is less than the voltage of the first input terminal of the first comparator OP1 (the output voltage of the rectifying bridge 221). The output terminal of the first comparator OP1 outputs a high level voltage (the first comparison signal Output1), and the voltage of the second input terminal of the second comparator OP2 (the output voltage of the rectifying bridge 221) is also greater than a voltage of the first input terminal of the second comparator OP2. The output terminal of the second comparator OP2 outputs a low level voltage (the second comparison signal Output2).

The controlling terminal of the first transistor Q20 of the first controlling device of the controlling module 26 receives the first comparison signal Output1 with the high level voltage, and the first transistor Q20 turns on. The power is connected with the ground through the first transistor Q20, and the controlling terminal of the second transistor Q15 of the first controlling device does not receive an input signal, so the second transistor Q15 turns off. Then, the first filtering capacitor CP5 is disconnected with the ground through the second transistor Q15, and the first filtering capacitor CP5 ceases working.

The controlling terminal of the fourth transistor Q19 of the second controlling device of the controlling module 26 receives the first comparison signal Output1 with the high level voltage, the fourth transistor Q19 turns on. The controlling terminal of the fifth transistor Q22 of the first controlling device receives the second comparison signal Output2 with the low level voltage, and the fifth transistor Q22 also turns off. The output voltage of the transforming module 23 is directly connected with the ground through the first diode D9 and the fourth transistor Q19, and the power pin VCC of the controlling chip U1 does not receive an input signal, so the controlling chip U1 ceases working.

At the same time, the gate controlling pin GATE of controlling chip U1 does not output signal to the controlling terminal of the third transistor Q12, and the third transistor Q12 turns off. The AC-DC conversion circuit is in a stop-working condition in order to prevent the damage to the AC-DC conversion circuit caused by the high working voltage.

Upon the condition that the output voltage of the rectifying bridge 221 is less than or equal to the second reference voltage Vref2, in other words, the voltage of A is less than or equal to first reference voltage Vref2, then, the voltage of the second input terminal of the first comparator OP1 (the first reference voltage Vref1) is greater than the voltage of the first input terminal of the first comparator OP1 (the output voltage of the rectifying bridge 221). The output terminal of the first comparator OP1 outputs a low level voltage (the first comparison signal Output1). The voltage of the second input terminal of the second comparator OP2 (the output voltage of the rectifying bridge 221) is also less than a voltage of the first input terminal of the second comparator OP2. The output terminal of the second comparator OP2 outputs a high level voltage (the second comparison signal Output2).

The controlling terminal of the first transistor Q20 of the first controlling device of the controlling module 26 receives the first comparison signal Output1 with the low level voltage, and the first transistor Q20 turns off. The controlling terminal of the second transistor Q15 of the first controlling device is connected with the power, the second transistor Q15 turns on, so the one terminal of the first filtering capacitor CP5 is connected with the ground through the second transistor Q15, and the first filtering capacitor CP5 works normally.

The controlling terminal of the fourth transistor Q19 of the second controlling device of the controlling module 26 receives the first comparison signal Output1 with the low level voltage, and the fourth transistor Q19 turns off. The controlling terminal of the fifth transistor Q22 of the first controlling device receives the second comparison signal Output2 with the high level voltage, and the fifth transistor Q22 turns on. The output voltage of the transforming module 23 is directly connected with the ground through the first diode D9 and the fifth transistor Q22, and the power pin VCC of the controlling chip U1 does not receive an input signal, so the controlling chip U1 ceases working.

At the same time, the gate controlling pin GATE of controlling chip U1 does not output signal to the controlling terminal of the third transistor Q12, so the third transistor Q12 turns off. Thereby, the AC-DC conversion circuit is in a stop-working condition in order to prevent the unstable low voltage output of the AC-DC conversion circuit.

The AC-DC conversion circuit of the present invention stops voltage output upon the condition that the input voltage is too high or too low by disposing the voltage detecting module and the controlling module to prevent the damage of the AC-DC conversion circuit and the unstable voltage output, which solves the technical problems of the prior art upon the condition that the input voltage is too high or too low, and the technical problem causes the output voltage to be unstable or the conversion circuit to be easily damaged.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. An AC-DC conversion circuit, comprising:
an inputting module used to input an AC voltage;
a rectifying module used to transform the AC voltage to a DC voltage;
a transforming module used to perform a transforming process;
an outputting module used to output the DC voltage after the transforming process;
a voltage detecting module used to detect the DC voltage outputted from the rectifying module; and
a controlling module used to control whether the AC-DC conversion circuit works or not according to a detecting result of the voltage detecting module;
wherein the rectifying module comprises:
a rectifying bridge used to transform the AC voltage received by the inputting module to the DC voltage; and
a first filtering capacitor used to filter the DC voltage;
a terminal of the first filtering capacitor being connected with an output of the rectifying bridge, another terminal of the first filtering capacitor being connected with a ground;
the outputting module comprises a second diode and a second filtering capacitor;
a positive electrode of the second diode being connected with an output of the transforming module, a negative electrode of the second diode being connected with an output of the AC-DC conversion circuit, a terminal of the second filtering capacitor being connected with the negative electrode of the second diode, another terminal of the second filtering capacitor being connected with the ground;
wherein the voltage detecting module comprises a first comparator and a second comparator;
a first input terminal of the first comparator being connected with the output of the rectifying bridge, a second input terminal of the first comparator receives a first reference voltage, and an output terminal of the first comparator outputs a first comparison signal;
a second input terminal of the second comparator being connected with the output of the rectifying bridge, a first input terminal of the second comparator receives a second reference voltage, and an output terminal of the second comparator outputs a second comparison signal;
wherein the controlling module comprises a first controlling device;
the first controlling device comprises a first transistor and a second transistor, a controlling terminal of the first transistor receives the first comparison signal, an output terminal of the first transistor being connected with the ground, an input terminal of the first transistor being individually connected with a controlling terminal of the second transistor and a power, an input terminal of the second transistor being connected with the first filtering capacitor, and an output terminal of the second transistor being connected with the ground.

2. The AC-DC conversion circuit according to claim 1, wherein while the output voltage of the rectifying bridge is greater than or equal to the first reference voltage, the first comparison signal is at a high level, the first transistor turns on, and the second transistor turns off;
while the output voltage of the rectifying bridge is less than the first reference voltage, the first comparison signal is at a low level, the first transistor turns off, and the second transistor turns on.

3. An AC-DC conversion circuit, comprising:
an inputting module used to inputting an AC voltage;
a rectifying module used to transform the AC voltage to a DC voltage;

a transforming module used to perform a transforming process;

an outputting module used to output the DC voltage after the transforming process;

a voltage detecting module used to detect the DC voltage outputted from the rectifying module; and a controlling module used to control whether the AC-DC conversion circuit works or not according to a detecting result of the voltage detecting module;

wherein the rectifying module comprises:

a rectifying bridge used to transform the AC voltage received by the inputting module to the DC voltage; and a first filtering capacitor used to filter the DC voltage;

a terminal of the first filtering capacitor being connected with an output of the rectifying bridge, another terminal of the first filtering capacitor being connected with a ground;

wherein the voltage detecting module comprisies a first comparator and a second comparator;

a first input terminal of the first comparator being connected with the output of the rectifying bridge, a second input terminal of the first comparator receives a first reference voltage, and an output terminal of the first comparator outputs a first comparison signal;

a second input terminal of the second comparator being connected with the output of the rectifying bridge, a first input terminal of the second comparator receives a second reference voltage, and an output terminal of the second comparator outputs a second comparison signal;

wherein the controlling module comprises a first controlling device;

the first controlling device comprises a first transistor and a second transistor, a controlling terminal of the first transistor receives the first comparison signal, an output terminal of the first transistor being connected with the ground, a input terminal of the first transistor being individually connected with a controlling terminal of the second transistor and a power, a input terminal of the second transistor being connected with the first filtering capacitor, and an output terminal of the second transistor being connected with the ground.

4. The AC-DC conversion circuit according to claim 3, wherein while the output voltage of the rectifying bridge is greater than or equal to the first reference voltage, the first comparison signal is at a high level, the first transistor turns on, and the second transistor turns off;

while the output voltage of the rectifying bridge is less than the first reference voltage, the first comparison signal is at a low level, the first transistor turns off, and the second transistor turns on.

5. The AC-DC conversion circuit according to claim 3, wherein the outputting module comprises a second diode and a second filtering capacitor;

a positive electrode of the second diode being connected with an output of the transforming module, a negative electrode of the second diode being connected with an output of the AC-DC conversion circuit, a terminal of the second filtering capacitor being connected with the negative electrode of the second diode, and another terminal of the second filtering capacitor being connected with the ground.

6. An AC-DC conversion circuit, comprising:

an inputting module used to input an AC voltage;

a rectifying module used to transform the AC voltage to a DC voltage;

a transforming module used to perform a transforming process;

an outputting module used to output the DC voltage after the transforming process;

a voltage detecting module used to detect the DC voltage outputted from the rectifying module; and a controlling module used to control whether the AC-DC conversion circuit works or not according to a detecting result of the voltage detecting module;

wherein the rectifying module comprises:

a rectifying bridge used to transform the AC voltage received by the inputting module to the DC voltage; and a first filtering capacitor used to filter the DC voltage;

a terminal of the first filtering capacitor being connected with an output of the rectifying bridge, another terminal of the first filtering capacitor being connected with a ground;

the outputting module comprises a second diode and a second filtering capacitor;

a positive electrode of the second diode being connected with an output of the transforming module, a negative electrode of the second diode being connected with an output of the AC-DC conversion circuit, a terminal of the second filtering capacitor being connected with the negative electrode of the second diode, another terminal of the second filtering capacitor being connected with the ground;

wherein the controlling module comprises a second controlling device;

the second controlling device comprises a controlling chip and a third transistor, the controlling chip comprises a power pin, an over current protection pin, and a gate controlling pin;

a controlling terminal of the third transistor being connected with the gate controlling pin of the controlling chip, an inputting terminal of the third transistor being connected with the outputting terminal of the rectifying module, an outputting terminal of the third transistor is individually connected with the over current protection pin and the ground;

the power pin of the controlling chip being connected with the output terminal of the rectifying module by the transforming module.

7. The AC-DC conversion circuit according to claim 6, wherein the power pin of the controlling chip being connected with the transforming module by a first diode, a positive electrode of the first diode being connected with the transforming module, a negative electrode of the first diode being connected with the power pin of the controlling chip.

8. The AC-DC conversion circuit according to claim 6, wherein the second controlling device further comprises a fourth transistor and a fifth transistor;

a controlling terminal of the fourth transistor receives the first comparison signal, an input terminal of the fourth transistor being connected with the power pin of the controlling chip, and an output terminal of the fourth transistor being connected with the ground;

a controlling terminal of the fifth transistor receives the second comparison signal, an input terminal of the fifth transistor being connected with the power pin of the controlling chip, and an output terminal of the fifth transistor being connected with the ground.

9. The AC-DC conversion circuit according to claim 8, wherein when the output voltage of the rectifying bridge is greater than or equal to the first reference voltage, the first comparison signal is at a high level, the fourth transistor turns on, and the controlling chip stops working;

when the output voltage of the rectifying bridge is less than or equal to the second reference voltage, the second comparison signal is at a high level, the fifth transistor turns on, and the controlling chip stops working;

when the output voltage of the rectifying bridge is greater than the second reference voltage, and the output voltage of the rectifying bridge is less than the first reference voltage, the first comparison signal and the second comparison signal are both at a low level, the fourth transistor and the fifth transistor both turn off, and the controlling chip works normally.

10. An AC-DC conversion circuit, comprising:
an inputting module used to inputting an AC voltage;
a rectifying module used to transform the AC voltage to a DC voltage;
a transforming module used to perform a transforming process;
an outputting module used to output the DC voltage after the transforming process;
a voltage detecting module used to detect the DC voltage outputted from the rectifying module; and
a controlling module used to control whether the AC-DC conversion circuit works or not according to a detecting result of the voltage detecting module;
wherein the rectifying module comprises:
a rectifying bridge used to transform the AC voltage received by the inputting module to the DC voltage; and
a first filtering capacitor used to filter the DC voltage;
a terminal of the first filtering capacitor being connected with an output of the rectifying bridge, and another terminal of the first filtering capacitor being connected with a ground;
wherein the controlling module comprises a second controlling device;
the second controlling device comprises a controlling chip and a third transistor, the controlling chip comprises a power pin, an over current protection pin, and a gate controlling pin;
a controlling terminal of the third transistor being connected with the gate controlling pin of the controlling chip, an inputting terminal of the third transistor being connected with the outputting terminal of the rectifying module, an outputting terminal of the third transistor being individually connected with the over current protection pin and the ground;
the power pin of the controlling chip being connected with the output terminal of the rectifying module by the transforming module.

11. The AC-DC conversion circuit according to claim 10, wherein the power pin of the controlling chip is connected with the transforming module by a first diode, a positive electrode of the first diode is connected with the transforming module, a negative electrode of the first diode is connected with the power pin of the controlling chip.

12. The AC-DC conversion circuit according to claim 10, wherein the second controlling device further comprises a fourth transistor and a fifth transistor;
a controlling terminal of the fourth transistor receives the first comparison signal, an input terminal of the fourth transistor being connected with the power pin of the controlling chip, an output terminal of the fourth transistor being connected with the ground;
a controlling terminal of the fifth transistor receives the second comparison signal, an input terminal of the fifth transistor being connected with the power pin of the controlling chip, an output terminal of the fifth transistor being connected with the ground.

13. The AC-DC conversion circuit according to claim 12, wherein when the output voltage of the rectifying bridge is greater than or equal to the first reference voltage, the first comparison signal is at a high level, the fourth transistor turns on, and the controlling chip stops working.

14. The AC-DC conversion circuit according to claim 12, wherein when the output voltage of the rectifying bridge is less than or equal to the second reference voltage, the second comparison signal is at a high level, the fifth transistor turns on, and the controlling chip stops working.

15. The AC-DC conversion circuit according to claim 12, wherein when the output voltage of the rectifying bridge is greater than the second reference voltage, and the output voltage of the rectifying bridge is less than the first reference voltage, the first comparison signal and the second comparison signal are both at a low level, the fourth transistor and the fifth transistor both turn off, and the controlling chip works normally.

16. The AC-DC conversion circuit according to claim 10, wherein the outputting module comprises a second diode and a second filtering capacitor;
a positive electrode of the second diode being connected with an output of the transforming module, a negative electrode of the second diode being connected with an output of the AC-DC conversion circuit, a terminal of the second filtering capacitor being connected with the negative electrode of the second diode, and another terminal of the second filtering capacitor being connected with the ground.

* * * * *